United States Patent
Townsend

(10) Patent No.: US 6,357,346 B1
(45) Date of Patent: Mar. 19, 2002

(54) MEAT SKINNING MACHINE

(76) Inventor: Ray T. Townsend, 3131 Fleur Dr., Des Moines, IA (US) 50321

( * ) Notice: Subject to any disclaimer, the term of this patent is extended or adjusted under 35 U.S.C. 154(b) by 45 days.

(21) Appl. No.: 09/877,872

(22) Filed: Jun. 8, 2001

(51) Int. Cl.[7] .............................. A22B 5/16; A22C 17/12
(52) U.S. Cl. .............................. 99/589; 99/584; 83/105; 452/127
(58) Field of Search .......................... 99/485, 486, 537, 99/538, 539, 540, 584, 589–591, 588, 489–492; 83/870, 871, 873, 105; 452/127, 125

(56) References Cited

U.S. PATENT DOCUMENTS

| | | | | |
|---|---|---|---|---|
| 3,542,103 A | * | 11/1970 | Townsend | 99/589 X |
| 3,559,707 A | * | 2/1971 | Townsend | 99/589 X |
| 3,613,154 A | * | 10/1971 | Townsend | 99/589 X |
| 3,844,207 A | * | 10/1974 | Townsend | 99/589 |
| 3,858,502 A | * | 1/1975 | Townsend | 99/589 |
| 4,292,710 A | * | 10/1981 | Townsend | 99/589 X |
| 4,606,093 A | * | 8/1986 | Townsend | 99/589 X |
| 4,730,368 A | * | 3/1988 | Townsend | 99/589 X |
| 4,784,056 A | * | 11/1988 | Townsend | 99/589 |
| 4,920,875 A | * | 5/1990 | Schill | 99/589 |
| 5,011,454 A | * | 4/1991 | Townsend | 452/125 |
| 5,609,519 A | * | 3/1997 | Townsend | 452/127 |

* cited by examiner

Primary Examiner—Timothy F. Simone
(74) Attorney, Agent, or Firm—Zarley, McKee, Thomte, Voorhees & Sease

(57) ABSTRACT

A meat skinning machine has a frame with an elongated skinning blade mounted thereon. The skinning blade has an elongated cutting edge. An elongated gripper roll is rotatably mounted on the frame adjacent the blade for pulling the meat product to be skinning into operational contact with the cutting edge of the blade. A plurality of rows of teeth extend longitudinally on the outer surface of the roll with each row of teeth terminating in a cutting edge. The foregoing structure is conventional. A plurality of secondary teeth are formed on the cutting edges of the rows of teeth to facilitate the gripping of a meat product. The secondary teeth are smaller than the teeth in the rows of teeth. The cutting edge of the blade is comprised of a plurality of serrated teeth.

7 Claims, 4 Drawing Sheets

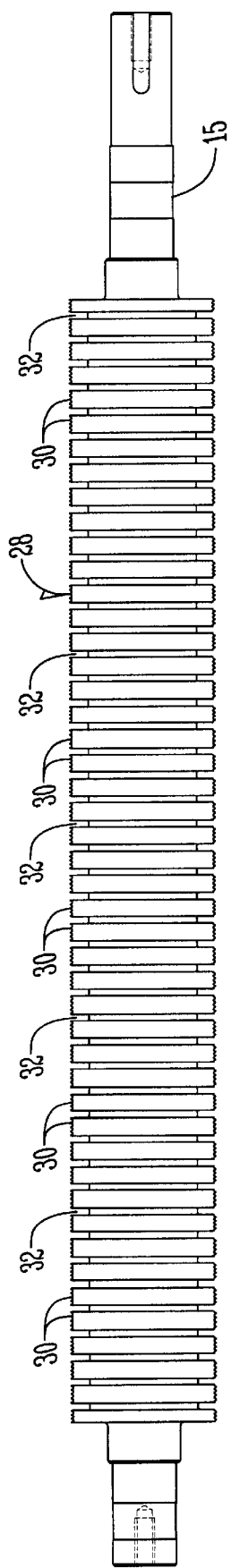
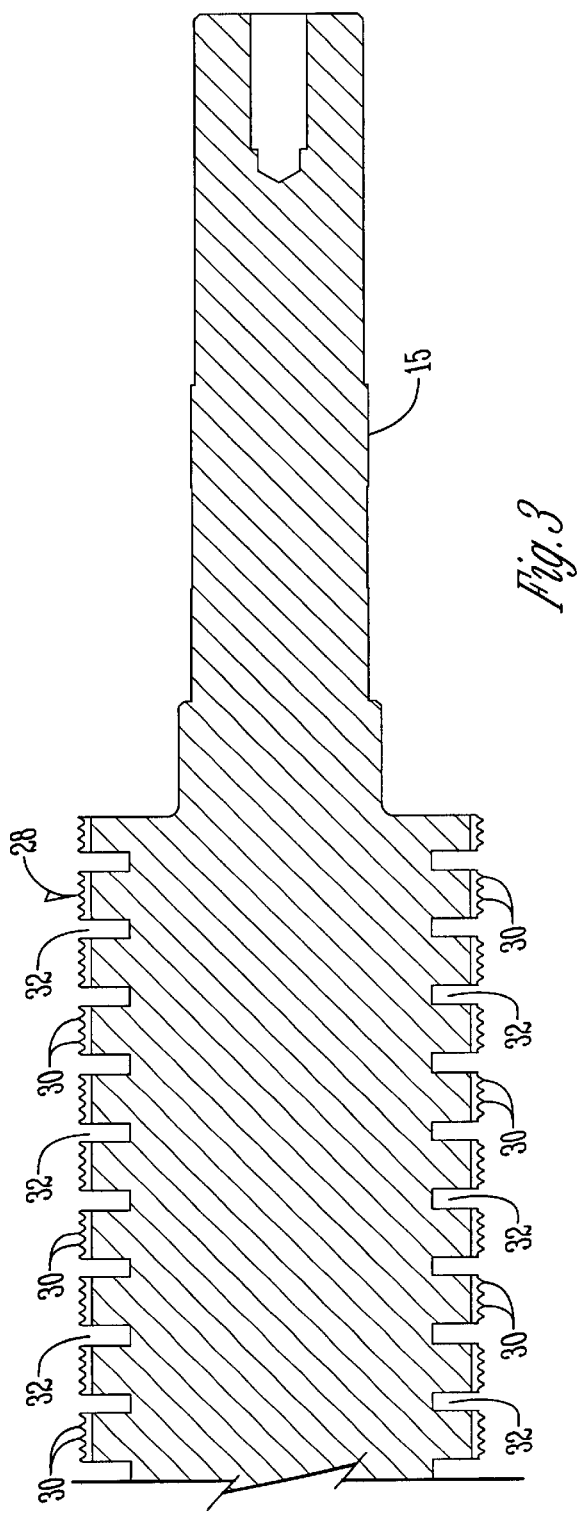

MEAT SKINNING MACHINE

BACKGROUND OF THE INVENTION

For many years, machines have been used to cut a layer of skin from a meat product. These machines typically have a gripper roll with a plurality of teeth positioned underneath and adjacent to an elongated sharp cutting blade which is held in place by a shoe and a clamp that binds the blade between the clamp and the shoe. As the meat is moved toward the blade, it is gripped by the teeth on the gripper roll which draws the meat product into contact with the blade whereby a layer of skin is cut from the skin and pulled between the gripper roll and the shoe while the meat moves upwardly over the blade and the clamp.

A universal problem that has plagued skinning machines forever is the difficulty of "starting" a meat product into contact with the cutting blade to commence the skinning operation.

A principal object of this invention is to provide a gripper roll for a skinning machine which will greatly facilitate the starting action.

A further object of this invention is to provide a serrated blade for the skinning machine to function in conjunction with the gripper roll.

A still further object of this invention is to have a gripper roll with conventional gripping teeth wherein a plurality of secondary teeth are cut into the normal rows of teeth to again greatly facilitate the gripping action of the roll.

These and other objects will be apparent to those skilled in the art.

SUMMARY OF THE INVENTION

A meat skinning machine has a frame with an elongated skinning blade mounted thereon. The skinning blade has an elongated cutting edge. An elongated gripper roll is rotatably mounted on the frame adjacent the blade for pulling the meat product to be skinned into operational contact with the cutting edge of the blade. A plurality of rows of teeth extend longitudinally on the outer surface of the roll with each row of teeth terminating in a cutting edge. The foregoing structure is conventional.

A plurality of secondary teeth are formed on the cutting edges of the rows of teeth to facilitate the gripping of a meat product. The secondary teeth are smaller than the teeth in the rows of teeth. The cutting edge of the blade is comprised of a plurality of serrated teeth.

BRIEF DESCRIPTION OF THE DRAWINGS

FIG. 2 is an elevational view of the gripper roll of this invention;

FIG. 3 is an enlarged scale elevational view of a portion of the gripper roll of FIG. 2;

DESCRIPTION OF THE PREFERRED EMBODIMENT

Figure 1:
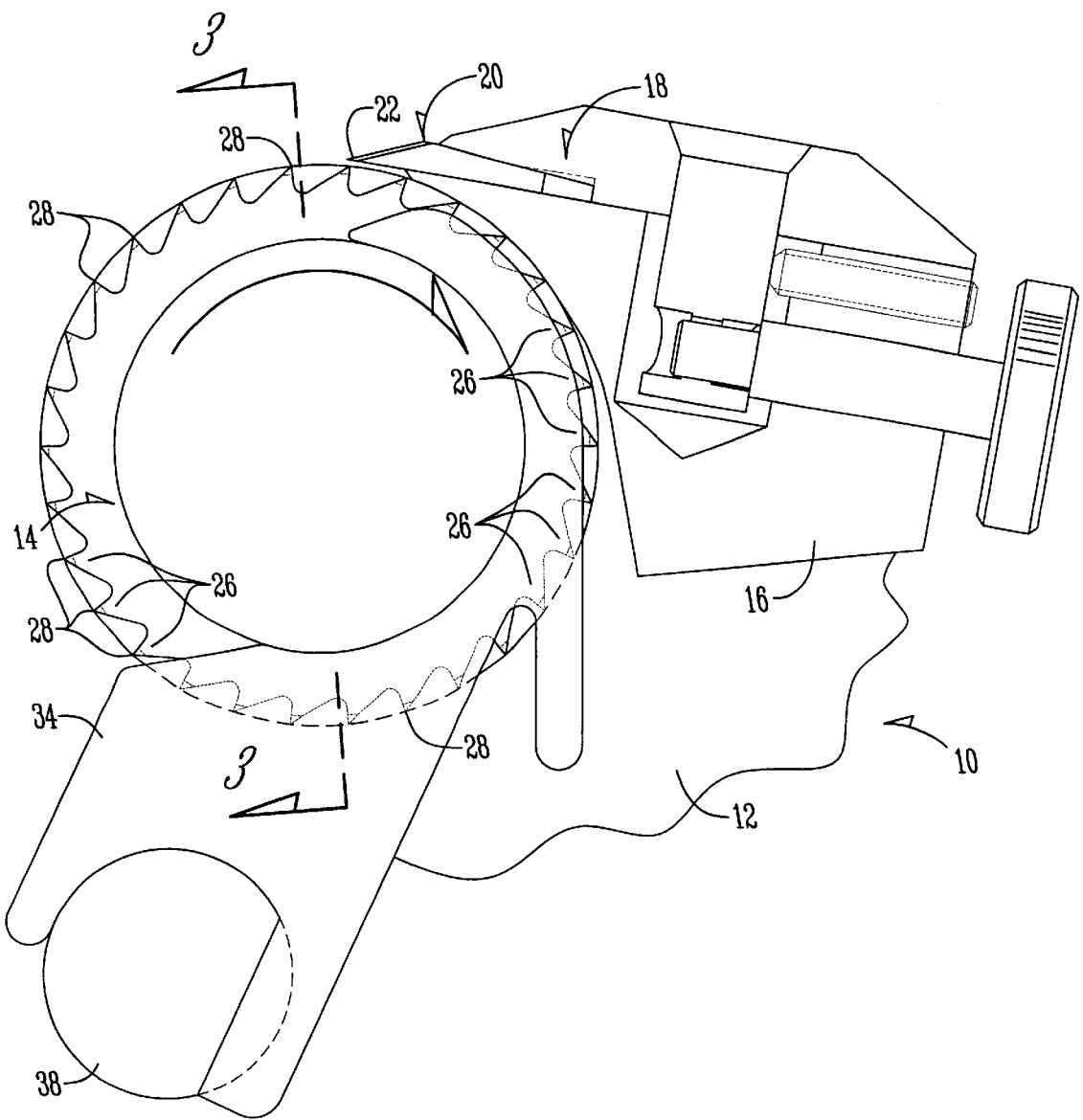
FIG. 1 is a side elevational view of a skinning machine using a gripper roll, a shoe, a clamp, a skinning blade, and skin removing elements acting in conjunction with the gripper roll.
Figure 1A:
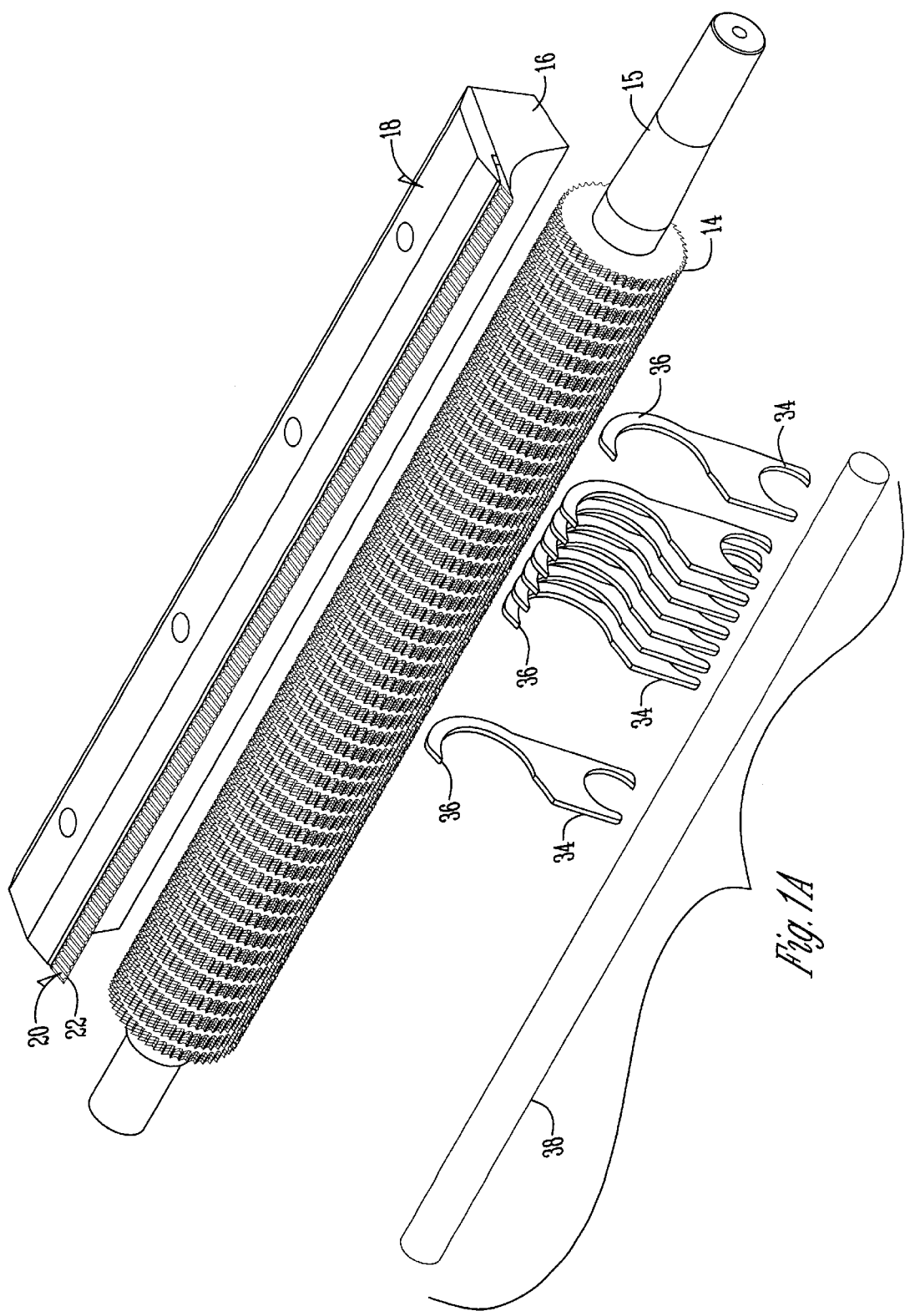
FIG. 1A is an exploded perspective view of the components of FIG. 1.
Figure 5:
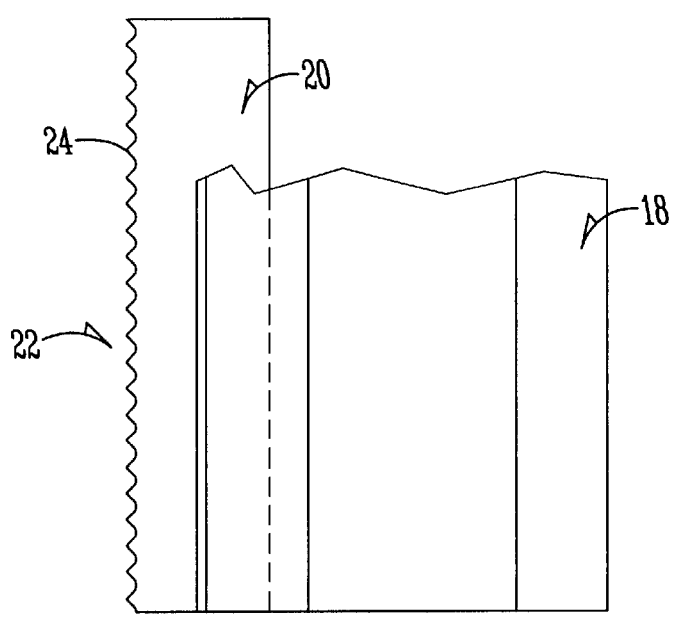
FIG. 5 is an enlarged scale plan view of a portion of the skinning blade.

With reference to FIG. 1, a skinning machine 10 has a frame 12 and an elongated cylindrical gripper roll 14. The gripper roll is rotatably mounted on the frame by means of shaft 15. A shoe 16 partially embraces the gripper roll 14 in conventional fashion. A clamp 18 is secured to shoe 16 in any convenient way and clamps elongated cutting blade 20 between the clamp and the shoe closely adjacent the peripheral outer surface of the gripper roll 14. The cutting edge 22 of the cutting blade is located just beyond a 12 o'clock position with respect to the gripper roll as shown in FIG. 1. The cutting edge 22 of blade 20 is comprised of a plurality of serrated teeth 24 best shown in FIG. 5.

Figure 4:
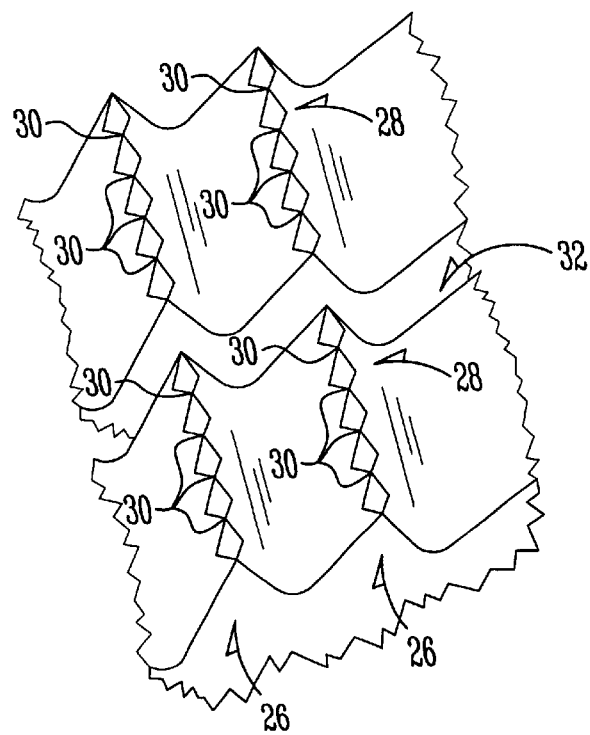
FIG. 4 is an enlarged scale perspective view of the cutting teeth on the roll of FIG. 3.

A plurality of parallel elongated rows of teeth 26 (FIG. 1) extend longitudinally on an outer cylindrical surface of the gripper roll 14. Each of the rows of teeth 26 terminate in an outwardly protruding cutting edge 28 (FIG. 1). As best shown in FIG. 4, a plurality of smaller secondary teeth 30 are formed in the cutting edge 28 of the rows of teeth 26. The secondary teeth 30 are much smaller and finer than the teeth 26 comprising the rows.

A plurality of parallel annular grooves 32 are cut into gripper roll 14 to receive cleaning elements 34 which are comprised of hook portions 36 which extend into the annular grooves 32. The cleaning elements 34 are mounted conventionally on shaft 38. The cleaning elements per se do not comprise the present invention. Other stripping mechanisms such as a separate stripper roll (not shown) rotating adjacent the lower periphery of gripper roll 14 can also be used to clean the roll in a conventional manner.

The essence of this invention is the use of the secondary teeth 30 on the otherwise conventional teeth 26 of gripper roll 14. The secondary teeth 30 add additional gripping effectiveness to the roll 14 and greatly enhance the starting operation described above. The use of the secondary teeth 30 with the second serrated teeth 24 on the cutting edge 22 of blade 20 presents a greatly improved skinning machine phenomenon which greatly enhances the starting action of skinning machines as compared to the conventional skinning machines in the art.

What is claimed is:

1. A meat skinning machine, comprising
   a frame,
   an elongated skinning blade mounted on the frame and having an elongated cutting edge,
   an elongated gripper roll rotatably mounted on the frame adjacent the blade for pulling a meat product to be skinned into operational contact with the cutting edge of the blade,
   a plurality of rows of teeth extending longitudinally on an outer surface of the roll with each row of teeth terminating in a cutting edge,
   and a plurality of secondary teeth on the cutting edges of the rows of teeth to facilitate the gripping of the meat product.

2. The machine of claim 1 wherein the secondary teeth are smaller than the teeth in the rows of teeth.

3. The machine of claim 1 wherein the cutting edge of the blade is comprised of a plurality of serrated teeth.

4. The machine of claim 1 wherein a plurality of spaced parallel annular grooves are cut in the gripper roll across the parallel rolls of teeth to receive a stripper element to assist the removal from the gripper roll layers of skin removed from a meat product by the skinning blade.

5. A gripper roll for a meat skinning machine, comprising,
   an elongated cylindrical roll having a cylindrical outer surface,
   a plurality of rows of teeth extending longitudinally on the outer surface of the roll with each row of teeth terminating in a cutting edge, and a plurality of secondary teeth on the cutting edges of the rows of teeth to facilitate the gripping of the meat product.

6. The roll of claim 5 wherein secondary teeth are smaller than the teeth in the rows of teeth.

7. The roll of claim 5 wherein a plurality of spaced parallel annular grooves are cut in the gripper roll across the parallel rolls of teeth.

* * * * *